(12) United States Patent
Geertsen

(10) Patent No.: US 9,018,569 B2
(45) Date of Patent: Apr. 28, 2015

(54) ELECTRICAL HEATING SYSTEM FOR A SECTION OF FLUID TRANSPORT PIPE, SECTION AND PIPE EQUIPPED WITH SUCH AN ELECTRICAL HEATING SYSTEM

(75) Inventor: Christian Geertsen, Versailles (FR)

(73) Assignee: ITP SA, Louveciennes (FR)

( * ) Notice: Subject to any disclaimer, the term of this patent is extended or adjusted under 35 U.S.C. 154(b) by 437 days.

(21) Appl. No.: 13/534,803

(22) Filed: Jun. 27, 2012

(65) Prior Publication Data

US 2013/0014833 A1    Jan. 17, 2013

(30) Foreign Application Priority Data

Jul. 11, 2011  (FR) .................................... 11 02176
May 25, 2012  (FR) .................................... 12 01497

(51) Int. Cl.
*H05B 3/58*    (2006.01)
*H05B 6/56*    (2006.01)
*F17D 1/18*    (2006.01)
*F16L 53/00*   (2006.01)

(52) U.S. Cl.
CPC .......... *F16L 53/008* (2013.01); *Y10T 29/49117* (2015.01); *F16L 53/004* (2013.01); *H05B 6/56* (2013.01); *H05B 2203/016* (2013.01); *F17D 1/18* (2013.01)

(58) Field of Classification Search
USPC ......... 219/535, 549, 552, 553, 534, 536–539; 137/341; 29/825
See application file for complete search history.

(56) References Cited

U.S. PATENT DOCUMENTS 5,854,472  A  * 12/1998  Wildi ............................ 219/549
6,154,608  A    11/2000  Rochelle
2007/0235440 A1  10/2007  Gu et al.

FOREIGN PATENT DOCUMENTS

EP    0 122 071 A1    10/1984
EP    0122071    *    10/1984
FR    2 533 101 A1    3/1984

OTHER PUBLICATIONS

French Search Report issued in Application No. 11 02176; Dated Feb. 6, 2012 (With Translation).

* cited by examiner

*Primary Examiner* — Shawntina Fuqua
(74) *Attorney, Agent, or Firm* — Oliff PLC

(57) ABSTRACT

The invention relates to an electrical heating system for at least one section of a fluid transport pipe, the pipe comprising a casing in which the fluid to be transported flows, the heating system comprising electric wires arranged around the casing and intended to be powered, via connection elements, by an electrical power supply comprising several phases, system in which the electric wires are arranged in at least one set of several groups each comprising several electric wires, each of the groups in said set being intended to be supplied by a distinct phase, the electrical heating system comprising connecting units to perform an electrical connection and linking together the electric wires of each of said groups.

24 Claims, 10 Drawing Sheets

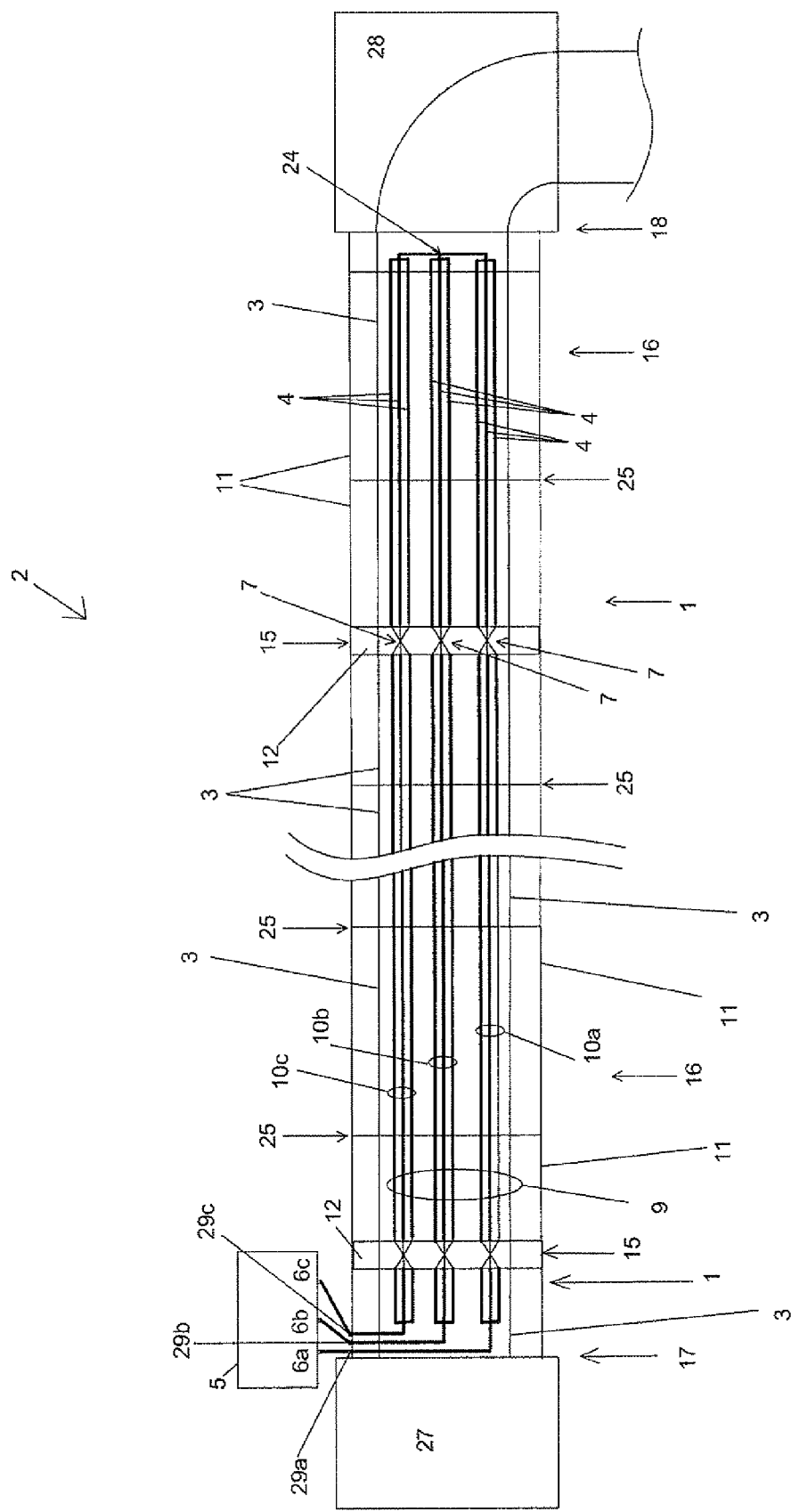

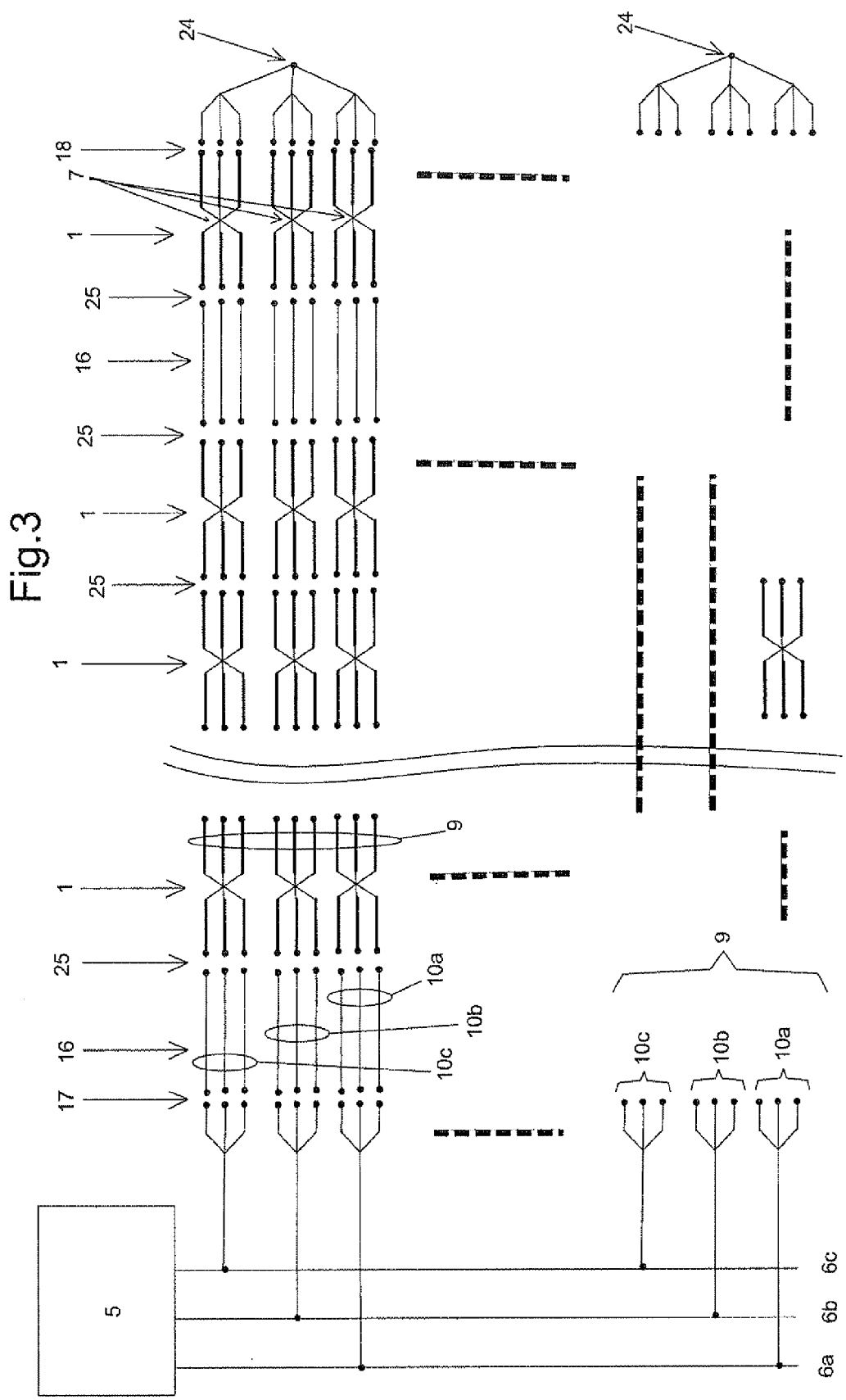

ELECTRICAL HEATING SYSTEM FOR A SECTION OF FLUID TRANSPORT PIPE, SECTION AND PIPE EQUIPPED WITH SUCH AN ELECTRICAL HEATING SYSTEM

BACKGROUND OF THE INVENTION

1. Field of the Invention

The technical scope of the present invention is that of heating system for fluid transport pipes. The invention relates in particular to the subsea or land transportation of hydrocarbons over great distances.

2. Description of the Related Art

To transport fluids in cold environments, for example for the subsea transport of hydrocarbons, one technical solution consists in heating the pipes to avoid the formation of obstructions resulting from the fluid cooling. A minimal temperature must therefore be maintained by heating the transport pipe. Electrical heating may be implemented to this end.

The robustness of the heating equipment must be suited to the environmental conditions in which the transport pipe is to be placed. Subsea hydrocarbon transport pipelines may be installed at depths of up to several kilometers making them all the more difficult to access for any maintenance or repair operations. These same difficulties may be encountered for land pipelines laid in a hostile environment.

Electrical heating wires for the transport pipe are generally positioned on the hydrocarbon flow pipe and are arranged under a protective casing. A layer of thermal insulation arranged under the protective casing is generally provided around the electrical heating wires and around the hydrocarbon flow pipe, so as to promote the heat exchange with the inner pipe and limit losses to the exterior. A double-walled pipe, also called a "pipe-in-pipe", comprises a metallic external protective casing arranged around an internal metallic casing forming the inner hydrocarbon flow pipe.

Once in place, the hydrocarbon transport pipes can be several tens of kilometers in length. As a result the electrical heating cables are also several tens of kilometers in length. The electric wires arranged along the transport pipe can, in particular, be assembled in series, thereby forming a line running along the pipeline. Three lines powered by a three-phase electrical power supply are, for example, connected to one end of the pipe to the three phases of the supply and are connected together at the other end of the pipe to form an electrically-balanced star assembly. Each of the three lines is generally formed of a plurality of electric cables mounted in series and linked together using electrical connectors. Several sets of three lines are thus arranged along the transport pipe and around its periphery, each constituting a heating circuit. Here, the heating system works by Joule effect, but this is also applicable when the heating comprises a magnetic component (inductive heating).

One problem, however, arises in the case of a defective connection between two wires. A full line becomes inoperative and thus also the heating circuit of which it is a part. The heating of the transport pipe is thus deteriorated despite the fact that the electrical safety components allow the lines associated with the defective line to be deactivated.

This problem concerning the faults in the electrical connections can occur for any type of section assembled end to end to form a pipeline. For straight sections that are typically 12 meters, 24 meters or 72 meters long, and which are assembled at sea on a pipe laying ship to gradually form the pipeline, the problem is all the greater in that it is impossible to act on the pipe after it has been installed on the sea bed.

It is further known that failures in electrical systems are in the majority linked to failures in the connections. The multiplication of wires and sections to produce a long length pipe thus leads to systems containing several tens of thousands of connections, thereby elevating the overall risk to an unacceptably high level.

For example, for a 100 km pipe laid in sections of 20 m, each incorporating 60 wires, there are 3000 connections per kilometer, therefore 300000 connections in all.

There would thus appear to be a need, with reference to pipes heated by electric wires, for the robustness of the electrical system to be improved with regard to faults in the electrical connections.

SUMMARY OF THE INVENTION

The aim of the present invention is to overcome one or several of the drawbacks in prior art by supplying an electrical heating system for a section in which the robustness has been improved with respect to the faults in the electrical connections.

This aim is reached thanks to an electrical heating system for at least one section of a fluid transport pipe, the pipe comprising a casing in which the fluid to be transported flows, the heating system comprising electric wires arranged around the casing and intended to be powered, via connection elements, by a power supply comprising several phases, wherein the electric wires are arranged in at least one set of several groups comprising several electric wires, each of the groups in said set being intended to be supplied by a distinct phase, the electrical heating system comprising connecting unit to perform an electrical connection and linking together the electric wires of each of said groups. Each set thus constitutes a heating circuit.

According to one particularity of the invention, said connecting units are arranged in an intermediate zone between the two ends of the section.

According to another particularity of the invention, the connection elements, arranged at the two ends of the sections, are associated with identification elements for the wires belonging to the same group.

According to another particularity of the invention, said set comprises as many groups as the number of phases in the power supply, each group of said set comprising the same number of electric wires, the groups in said set all having the same impedance.

According to another particularity of the invention, the heating system comprises a plurality of sets of several groups of several electric wires.

According to another particularity of the invention, the electric heating wires, arranged on the metallic fluid transport casing, are electrically insulated by an electrically-insulating thermally-conductive sheath.

Another object of the invention concerns a section of fluid transport pipe comprising a first casing in which the fluid to be transported flows, wherein it is equipped with a heating system according to the invention.

According to another particularity of the invention, the section comprises a second casing arranged around and at a distance from the first casing, forming an annulus in which to house the connection units and the set or sets of groups of electric wires.

According to another particularity of the invention, some sections arranged along the pipe comprise a reinforcing ring linking the first and second casings and forming an annular wall between the first and second casings, annular wall in which passages are arranged to accommodate the connection units to connect together the wires from a same group. Such a reinforcing ring is namely termed a "bulkhead".

According to another particularity of the invention, the reinforcing ring equipped with its connecting units constitutes a watertight partition, pneumatically cutting off the downstream annulus from the upstream annulus.

According to another particularity of the invention, the reinforcing rings are arranged at regular intervals along the pipeline, for example every kilometer.

According to another particularity of the invention, the section comprises an external mark to indicate the presence of said connecting units.

Another object of the present invention concerns a fluid transport pipe comprising sections equipped with electric heating wires linked together by said connection elements at the junctions between the sections, said connection elements arranged at one end of the pipe being linked to said power supply or to a neutral point of a final electric connector, further comprising one or several sections according to the invention.

Such a pipe is, for example, a subsea hydrocarbon transport pipe.

The final electric connector is, for example, a neutral point for a star assembly for a three-phase power supply.

According to another particularity of the invention, the pipe comprises sections that are not equipped with said connecting units electrically linking the electric wires of a same group together, the two types of sections being equipped with the same number of electric heating wires connected in series at the junction between two sections.

According to another particularity of the invention, the power supply, of the three-phase type, comprises its three phases linked at one end of the pipe and to the electric wires, all the electric wires of all the groups of all the sets being further linked together at the other end of the pipe to form a star assembly for each heating circuit.

According to another particularity of the invention, each heating circuit comprises protection (for example, fuses) and control units, arranged on a power supply board at the exterior of the pipe.

Another object of the invention concerns a laying process for a hydrocarbon transport pipe comprising sections, each section comprising an inner casing in which the fluid to be transported flows and an outer casing between which an annular space is formed in which an insulating material and electric wires are arranged around the inner casing that are intended to be supplied with electrical power via connection elements, by a main power supply comprising several phases, process in which:

the inner casing of an end section is welded to an inner ring of a reinforcing ring comprising an external ring integral with its inner ring, the connection elements of the electric wires are connected to the connection elements of the reinforcing ring according to at least one set of several groups of several electric wires, each of the groups in said set being intended to be powered by a distinct phase of said main power supply, the electric heating wires are temporarily powered by at least one add-on power supply comprising several phases each distinctly powering one of the electric wires in the same group, the outer casing of the pipe is joined to the external ring of the reinforcing ring by welding a tubular element formed by a sleeve or by two half-shells, the electric wires of each of the said groups are electrically connected together.

This laying process for the hydrocarbon transport pipe additionally enables the pre-stressing to be made of portions of pipe composed of several sections and each linked to a reinforcing ring at both ends. The pre-stressing is performed portion by portion. To this end and during the assembly phase only, the electric heating circuits are used to preferentially heat the inner tube so that it dilates to a predetermined length before it is anchored by being welded to the external tube. The specific organization of the electric wires enables a reduced length of pipe to be selectively heated, during this construction phase, so as to perform the pre-stressing from portion to portion. This laying process is particularly suited to assembly on land.

According to another particularity of the invention, when the electric heating wires are temporarily powered by said add-on power supply, the temperature of the inner casing is monitored, directly or by measurement of the corresponding axial dilation of the inner casing, to pilot the heating of the inner casing up to a median temperature that is between a maximal operating temperature and a minimal temperature of the external environment.

According to another particularity of the invention, the stage during which the outer casing of the pipe is joined to the external ring of the reinforcing ring is preceded by a stage in which a thermally insulating material is arranged around the first casing radially according to the installation zone of the tubular element.

According to another particularity of the invention, a plurality of sections is laid and mechanically and electrically joined together, these sections being arranged between two reinforcing rings wherein said electric wires in a same group are electrically connected.

BRIEF DESCRIPTION OF THE DRAWINGS

Other characteristics, advantages and particulars of the invention will become more apparent from the additional description made hereafter of the embodiments and given by way of example and with reference to the drawings, in which:

FIG. 2 shows a pipe according to the invention;

FIG. 3 shows an electrical heating system for a pipe according to the invention;

DETAILED DESCRIPTION OF PREFERRED EMBODIMENTS

The invention will now be described in more detail.

Figure 1:
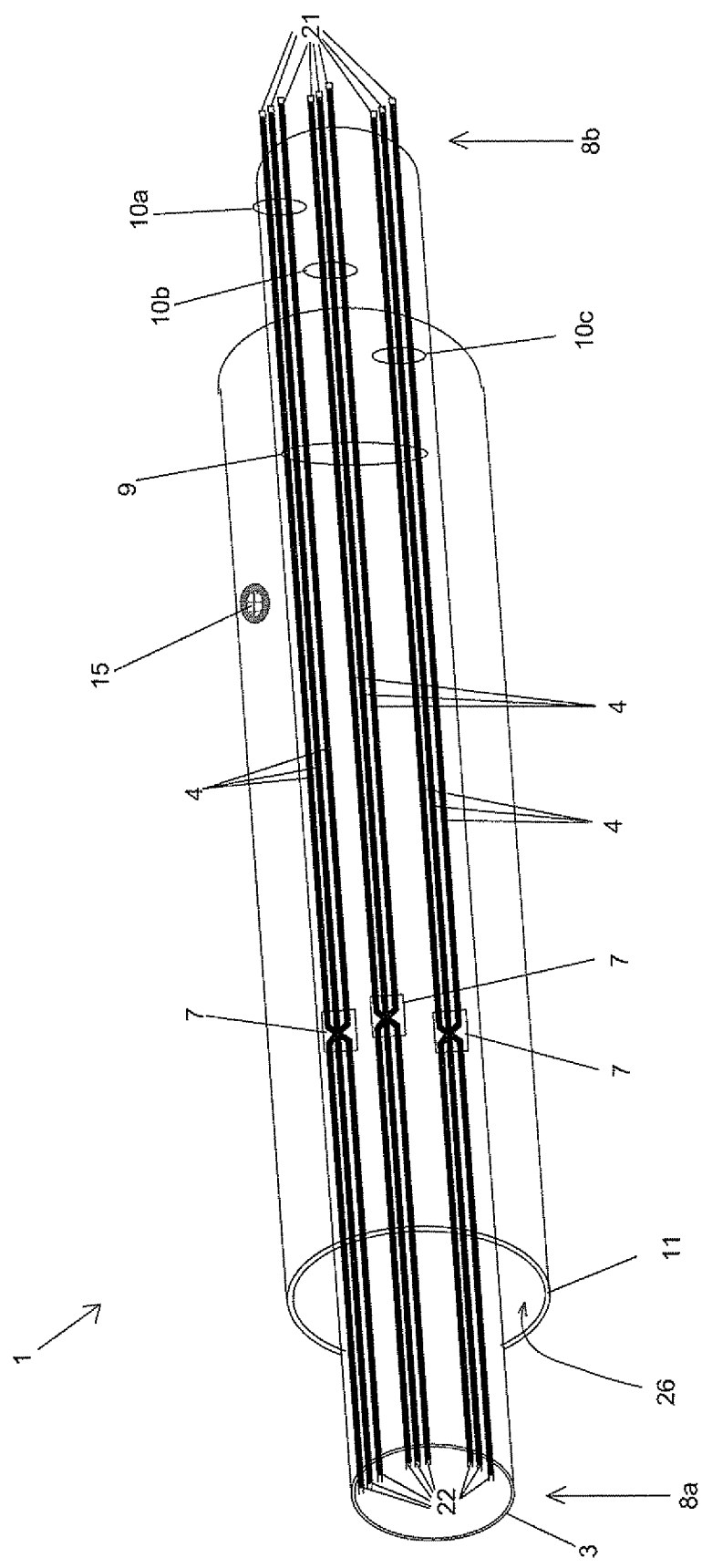
FIG. 1 shows a section according to the invention.

FIG. 1 shows a section 1 intended to be assembled with other sections to form a fluid transport metallic pipe 2 to transport fluids, such as hydrocarbons. The section 1 comprises a first casing 3, or inner casing, in which the fluid to be transported flows.

A second casing 11 is arranged around and at a distance from the first one 3. The two casings 3 and 11 delimit an annulus 26. This annulus 26 accommodates, for example, the heating system as well as thermal insulation for the first casing 3. The first casing 3 may be metallic, as may the second casing. The first and second casings are, for example, made of steel or another metal. The second casing 11 is shown transparently so as to reveal the heating system, no insulating material being shown in FIG. 1.

A pipe with a single casing may also be envisaged with electric heating wires pressed against the outer wall of the metallic casing and held in place by holding means such as straps or a plastic sleeve.

The heating system comprises electric wires 4 arranged around the first casing 3. These wires will be powered via connection elements 21 and 22 using a power supply with several phases. The phases of the power supply will designate the supply points powered by the power supply. A neutral wire may also be designated as a phase of the power supply. A person skilled in the art will recognize that a direct current power supply may also be envisaged and that the discussion here is based on the notion of phase for the sake of clarity.

The electric wires 4 are arranged in a set 9 of several groups 10a, 10b, 10c each with several electric wires 4. Each group in this set 9 will be powered by a distinct phase. The heating system additionally comprises connecting units 7 making an electrical connection and linking together the electric wires 4 of each of these groups 10a, 10b and 10c.

As can be seen in FIG. 1, the annulus 26 of the double-walled section is used to house part of the heating system including the connecting units 7 for connecting the electric wires 4 of each group.

An external indicating mark 15 is made to indicate the presence of the connecting units 7 linking the wires of one group together. This indicator mark 15 is made so as to be visible from the exterior of the section 1. The mark 15 is, for example, painted or engraved on the exterior of the outer casing 11.

The connection elements at one end 8a are for example, female couplings 22 and the connection elements at the other end 8b are male couplings 21. Thus the sections welded together by their inner fluid transport casing 3 are associated with electric cables 4 electrically linked in series. A double-walled pipe namely protects the heating and thermally insulating systems.

The connecting units 7 are, for example, arranged in an intermediate area between the two ends 8a and 8b of the section 1, as seen in FIG. 1, but the connecting units 7 may also be positioned at the level of the connection elements 21 and 22.

FIG. 2 shows a pipe 2 according to the invention. Its heating system comprises a set 9 of three groups 10a, 10b and 10c each with three wires 4. Each of these groups is powered by a distinct phase. Terminals 29a, 29b and 29c arranged at the exterior of the outer casing 11 are each linked to a group 10a, 10b or 10c at one end of the pipe 17. These terminals 29a, 29b and 29c are also each linked to a power supply phase 6a, 6b and 6c.

The pipe 2 extends between a fluid emitting set (for example a wellhead) and a fluid receiving set 27 (for example, an oil-water separation unit).

The pipe 2 shown in FIG. 2 comprises sections 1 equipped with connecting units 7 for the wires of a same group. These sections 1 are indicated namely by an external mark 15 that corresponds, for example, to a reinforcing ring 12 integrated into the section 1, but other types of marks can be provided and positioned anywhere along the section. A section equipped with connecting units 7 and marked can be inserted regularly as the pipeline 2 is being made.

The pipe 2 also comprises, for example, sections 16 that are not equipped with connecting units 7 to electrically connect the electric wires 4 together, the two types of sections being equipped with the same number of electric wires 4 for heating, these wires 4 being connected two by two, in series, at the junction 25 between two sections 16 or 1.

An electrical neutral point 24, also called a star point, is made at the end of the pipe. For very great lengths, several electrical power supply points can be provided spaced along the pipeline.

A power supply 5 of the three-phase type may also be provided, whose three power phases 6a, 6b and 6c are connected firstly at one end 17 of the pipe 2 to the electric wires 4. Secondly, at the other end 18 of the pipe 2, all the electric wires 4 of all the groups 10a, 10b and 10c of all the sets 9 are furthermore electrically connected together to form a neutral point 24 of an electrical star assembly.

FIG. 3 shows a heating system for a fluid transport pipe. The connections between the successive section wires are schematized by two points positioned opposite one another. Here, the power supply 5 delivers three phases 6a, 6b and 6c of a balanced three-phase supply. Thus, the phases can be linked together at the end 18 opposing the end 17 at which the supply is connected, to form a balanced star assembly.

The heating system comprises several sets 9 of several groups 10a, 10b and 10c each with several electric wires 4. Only two sets 9 are shown here for practical reasons, but more could be provided. The connecting elements for control and protection positioned between the generator 5 and heating circuits 9 are not shown.

Each set 9 comprises as many groups 10a, 10b and 10c as phases 6a, 6b and 6c of the power supply 5. Each set 9 here comprises three groups. Each group 10a, 10b and 10c of each set 9 comprises the same number of electric wires 4, groups 10a, 10b and 10c therefore having the same impedance.

In the electrical diagram in FIG. 3, the sections 16 not equipped with connecting units 7 are associated with sections 1 that are equipped with these connecting units 7. A pipe might also be provided of which all the sections are equipped with connecting units 7 according to the invention, however, advantageously, the connecting units 7 are associated with a reinforcing ring 13 regularly spaced at a distance of approximately 1 km so as to limit the relative displacements between the inner and outer casing due to the transition thermal periods. This distance may be shorter in the vicinity of bends associated with a change in direction.

Advantageously, if a connection between connection elements 21 and 22, at the junction 25 between two sections, is defective, the current in the wires is cut off only up to the nearest connecting unit 7 on either side of this defective connection. Since the portion of unpowered wires is of short length in comparison with the full length of a line extending all along the pipe 2, the impedance of the group of wires is very little modified and the set remains balanced and operational.

The connecting unit 7 ensures a power supply to all the downstream wires in the group associated with this unit 7. The power is, in fact, supplied by at least one of the wires of the upstream group, up to the connecting unit 7.

The electric heating wires 4, arranged on the metal casing 3, are electrically insulated by a sheath. This sheath is electrically insulating and thermally conductive and enables the emission of heat by Joule effect. The electric wires are, for example, made of copper and the electrical insulation is made of PVC, silicon or a fluoropolymer.

The sections assembled end to end are, for example, straight sections. Such sections typically measure 12 m, 24 m or 72 m. A wound section, typically of a length of 1 km, can be equipped with several connecting units 7 according to the invention, regularly spaced along the wound section.

Thus, the heating system according to the invention can overcome defective electrical connections and other breakdowns such as the rupture of an electric wire 4. Heating remains operational for all the heating wires all around the pipe, by supplying a predetermined heating power.

It is also possible to provide groups each composed of two wires or four wires or five wires, or even more.

The number sets comprising groups which comprise wires and the number of wires in the groups of one set will be chosen, for example, as a function of the total number of wires equipping the section so as to make groups of similar impedance.

The number of groups can be a multiple of the number of phases.

Figure 4:
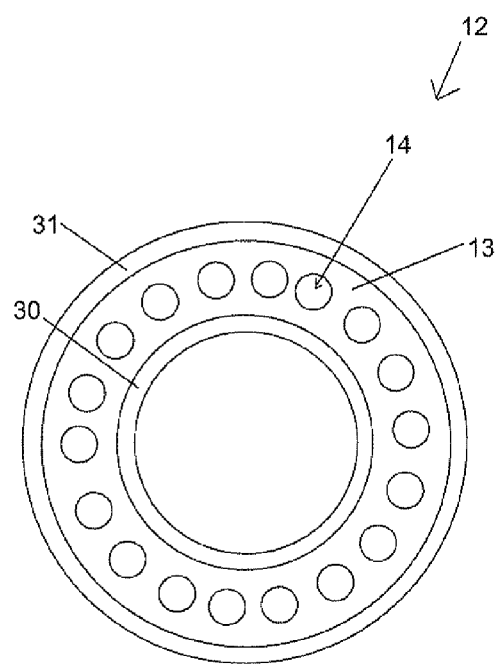
FIG. 4 shows a reinforcing ring.

FIG. 4 shows a reinforcing ring 12 intended to mechanically join together the inner and outer casings 3 and 11. Such a reinforcing ring 12 is also called a "bulkhead". This reinforcing ring 12 advantageously separates a section into two half-sections that are welded on either side of this reinforcing ring 12; however, it may also be positioned at the end of a section. The reinforcing ring comprises an inner ring 30 and an outer ring 31 joined together by an annular wall 13. Passages 14 are arranged in this wall 13.

When a pipe is being produced, the inner casings of a section are firstly welded on either side of the inner ring 30. The outer casings of a section are then welded on either side of the outer ring 31. Thus, a section 1 equipped with a reinforcing ring 12 is formed. The outer ring 31 can be seen, to the exterior of the section, thereby constituting a mark 15, such as described previously.

Figure 5:
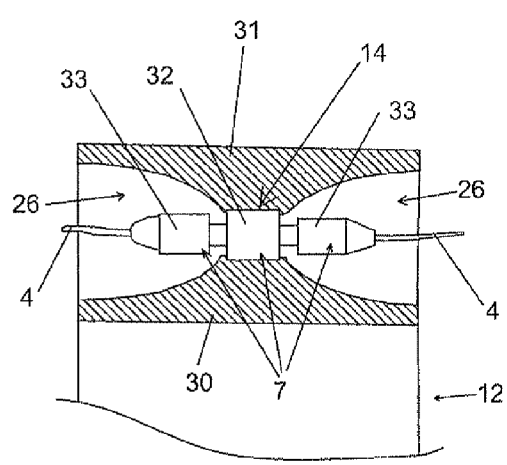
FIG. 5 shows a section view of a housing in the reinforcing ring in which a connection unit according to the invention is positioned.

FIG. 5 shows a section view made at a passage 14 equipped with a connecting unit 7. The connecting unit 7 may be positioned in the passage 14. Furthermore, the gap between the upper ring 31 and the lower ring 30 corresponds to the height of the annulus 26 in which the electric wires 4 are arranged. Unoccupied passages 14 may be used to form a continuous communication passage throughout the length of the annulus 26 in the pipeline.

Figure 6:
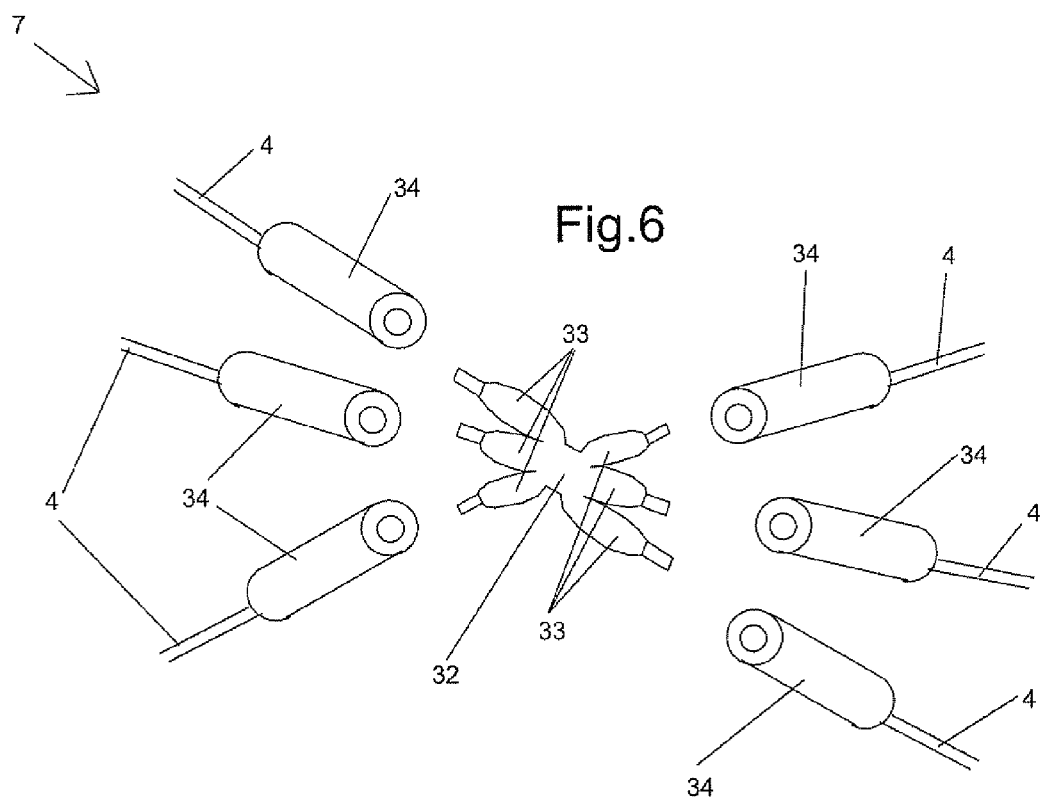
FIG. 6 shows an exploded view of a connection unit according to the invention that electrically connects three wires together.

FIG. 6 shows one example of a connecting unit 7 linking three electric wires 4 together. The unit 7 comprises a median cylindrical portion 32 of dimensions enabling it to be held in the passage 14 previously described and made in the reinforcing ring 12.

The portion 32 enables the reinforcing ring to be hermetically closed, thereby making the upstream and downstream annuluses independent of one another. This watertight sealing limits the consequences of any leakage of fluid into the annulus.

The median portion 32 is extended by three male connectors 33 on either side of the median part 32. These six male connectors 33 are all electrically linked together. The exterior of the portion 32 and of the male connectors 33 is electrically insulated, only the ends of the male connectors are conductive.

Female connectors 32 arranged at the end of electric wires 4 are positioned on the male connectors 33 to make an electrical connection. The connection of the three wires 4 of a group is thus performed. Advantageously, this electrical connection can be made inside the sections, the electrical connections in this case being more reliable than that made at sea when the sections are being joined together for the laying of the pipeline. The electrical connection of the wires of the same group made inside the section also enables this connection to be tested immediately after the production of the section in question. Reliability is thus also improved.

Figure 7:
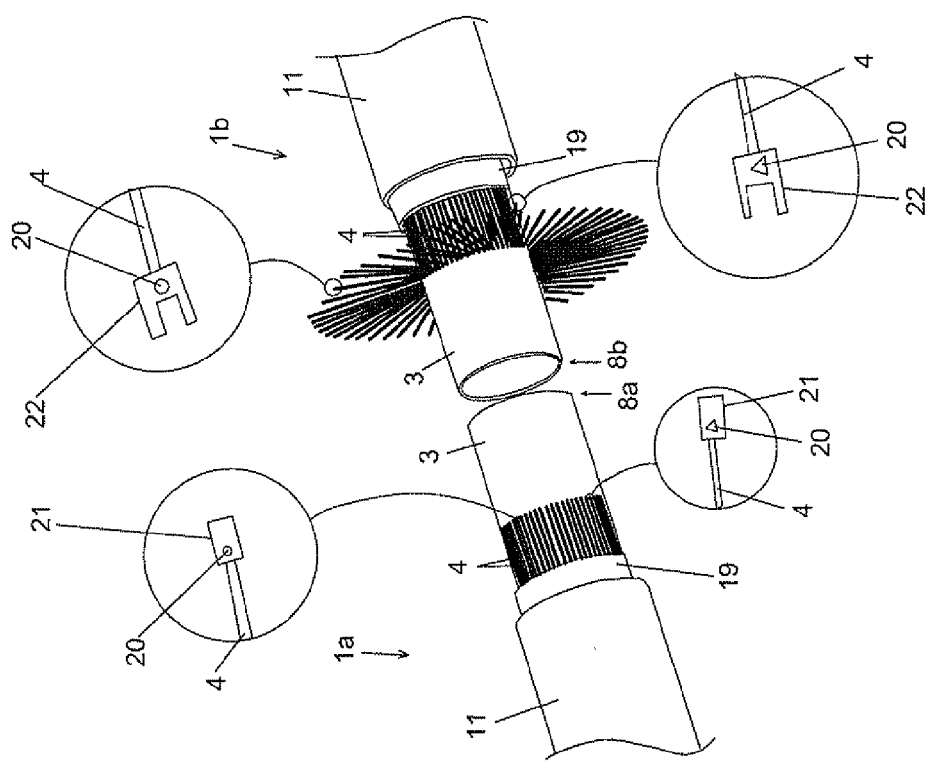

FIG. 7 shows the joining of two sections 1a and 1b of a double-walled pipeline. Each section comprises its outer casing 11 surrounding a layer of insulating material 19 arranged on electric heating wires 4 positioned on an inner casing 3. The ends of the wires 4 are equipped with a connector 21 or 22. A male connector 21 of the section 1a will be plugged into a female connector 22 of the other section 1b. The connectors 21 and 22 are all equipped with an identification element 20.

Figure 8:
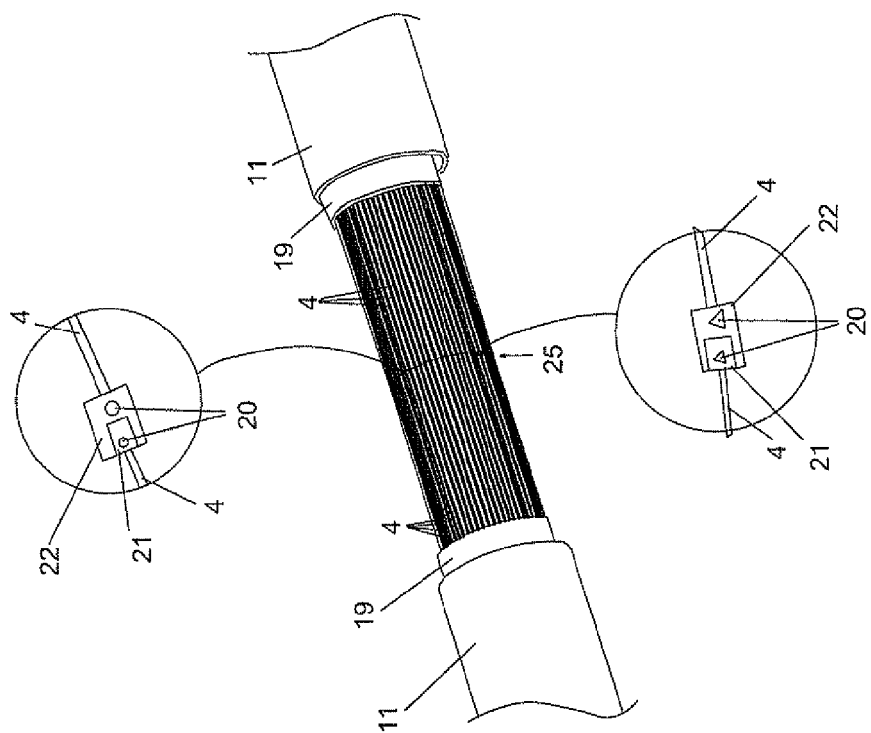
FIGS. 7 and 8 shows the ends of two sections installed end to end.

FIG. 8 shows the two ends of the inner casings 3 linked together by a weld made at the junction 25 of the two inner casings. The electric wires 14 are connected together. Thus, the electric current may be transmitted from one section to another. The electric wires 4 are thus connected two by two by a connecting element in the form of the male connector 21 or the female connector 22.

Figure 9:
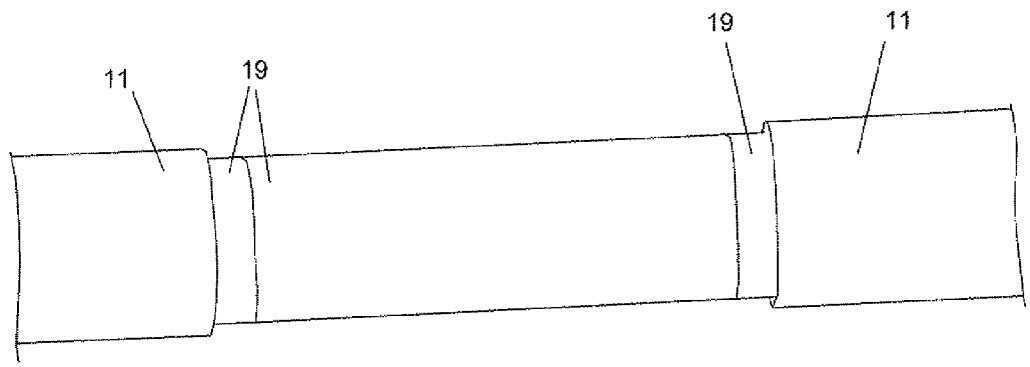
FIG. 9 shows two sections joined together before the linking of their outer casing.

FIG. 9 shows the covering of the electric wires, at the junction site, by a thermally insulating material 19. The insulating material 19 is thus arranged all along the pipe around the inner casing.

Figure 10:
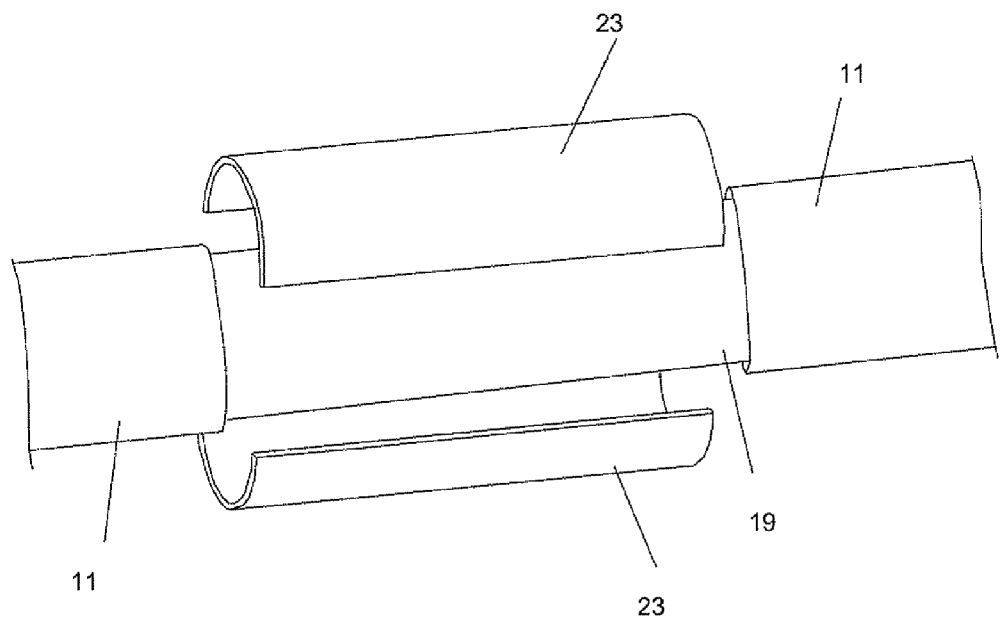
FIG. 10 shows the installation of two half-tubes to join the outer casings together of two double-walled sections.

FIG. 10 shows how the two half-cylinders 23 which will join the two outer casings 11 are put in place. Thus, a continuous outer casing is made along the full double-walled pipeline. Here, the inner casing of a section is of a longer length than its outer casing.

A section may also be provided whose outer casing is of the same length as its inner casing, the outer casing being translated, that case, to clear to the zone where the junction 25 is to be made between the inner casings. After the electrical connections have been made and the insulation has been put into place, the outer casing can be translated so as to be joined, by welding, to the outer casing of the other section.

Note that where sections of around 24 meters and comprising 60 wires are assembled end to end to form a pipe of 2 km in length, the number of electrical connections at the junction of the sections is around 5000. The importance of compensating any electrical faults here is all the easier to understand.

Figure 11:
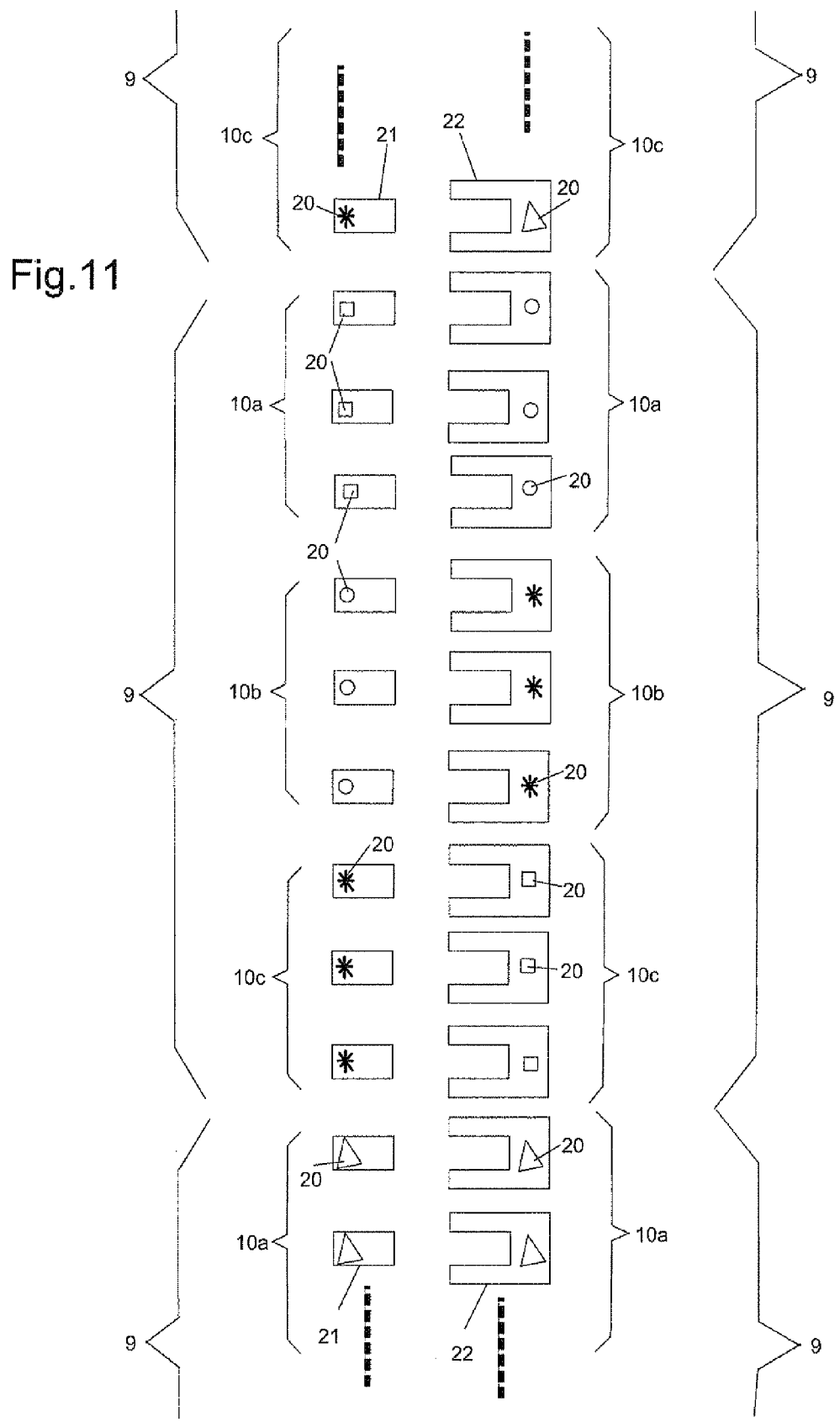
FIG. 11 shows the matching of the connection elements, organized by group, one with the other.

FIG. 11 shows the positioning of the connecting elements 21 and 22 with respect to one another. The connecting elements 21 and 22, arranged at the two ends of the section, are associated with identification elements 20 of the wires 4 belonging to the same group. In the case of sets 9 each comprising three groups 10a, 10b and 10c, each of the groups containing three wires, a same element 20 indicating to which group each wire belongs will be repeated three times, then another element 20 is repeated three times and so on. Two successive groups are thus associated with distinct indicator elements 20.

The identification element 20 indicating the belonging to a same group can be arranged on one face of the connecting element 21 or 22. The identification element 20 indicating the belonging to a same group is made, for example, by a marking that is painted or embossed.

FIG. 11 shows, non-exhaustively, on the different male and female connectors, different identification marks or symbols such as triangles, stars, squares or circles. Different colors may also be used.

Advantageously, this enables those wires from the same group to be identified. FIG. 11 shows one example of connections made in agreement with the indications supplied by the different identification elements 20. In this example, each group is composed of a same number of wires, whatever the group to which it belongs. Thus, one group can be connected indifferently to another, on condition that all the wires of a same group are connected to those of another same group.

The identification elements 20 advantageously enable the connection of two distinct groups to be avoided.

The connectors can also be linked mechanically by group, thereby enabling all the wires of one group to be connected to another group in one movement. This reduces the number of operations and maintains the continuity of each group all along the pipe.

Figure 12:
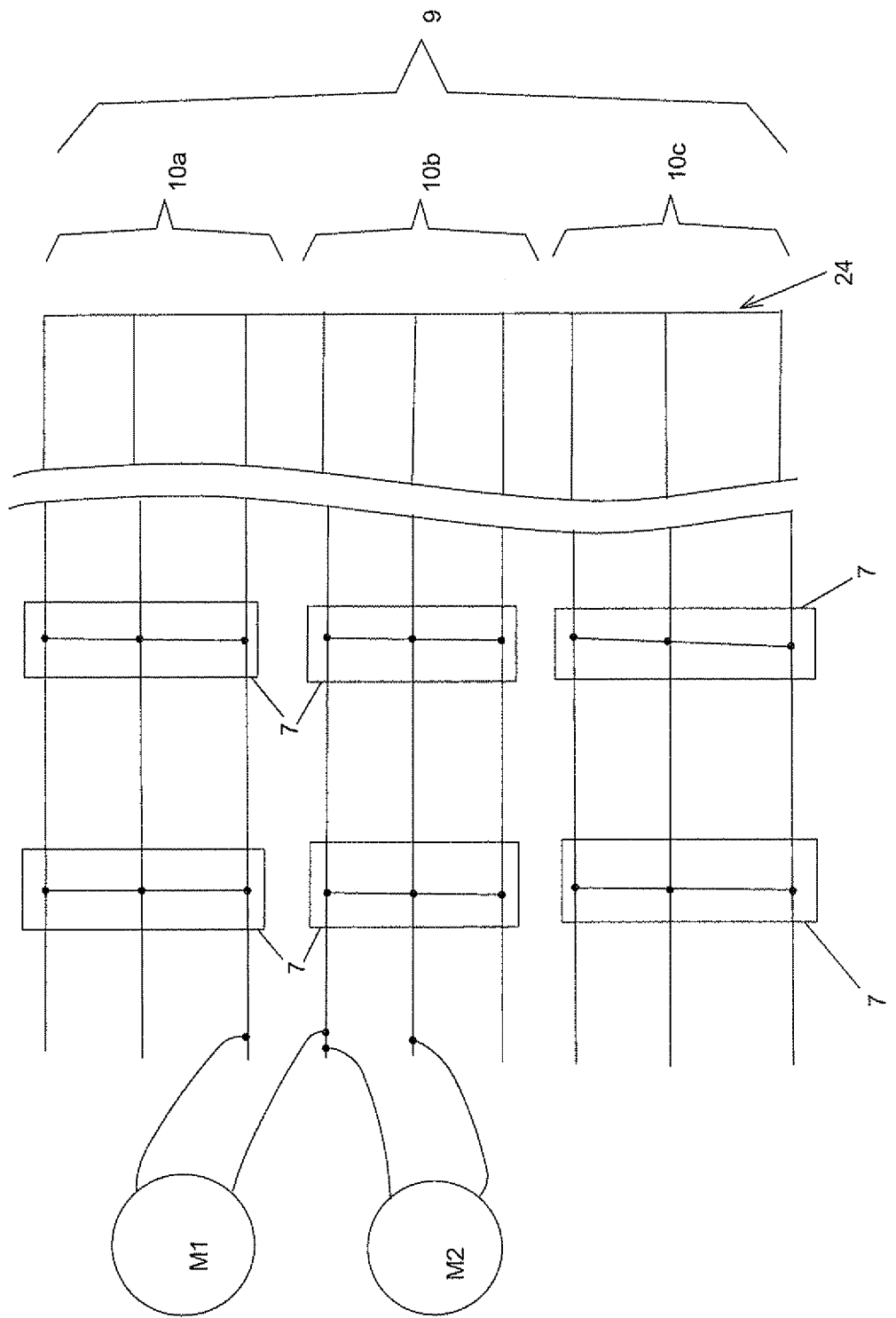
FIG. 12 shows the measurement of the impedance between two wires according to whether they belong to the same group or to different groups.

As shown in FIG. 12, it is also possible for the lines to be electrically tested so as to determine which ones belong to the same group. Such an electrical test is, for example, a measurement of the impedance. The impedance, measured by the Ohmmeter M1, between two wires of the same group is thus lower than the impedance, measured by the Ohmmeter M2, between two wires belonging to different groups, except for the realization of the pipe from the star point to the first connection 7.

Figure 13:
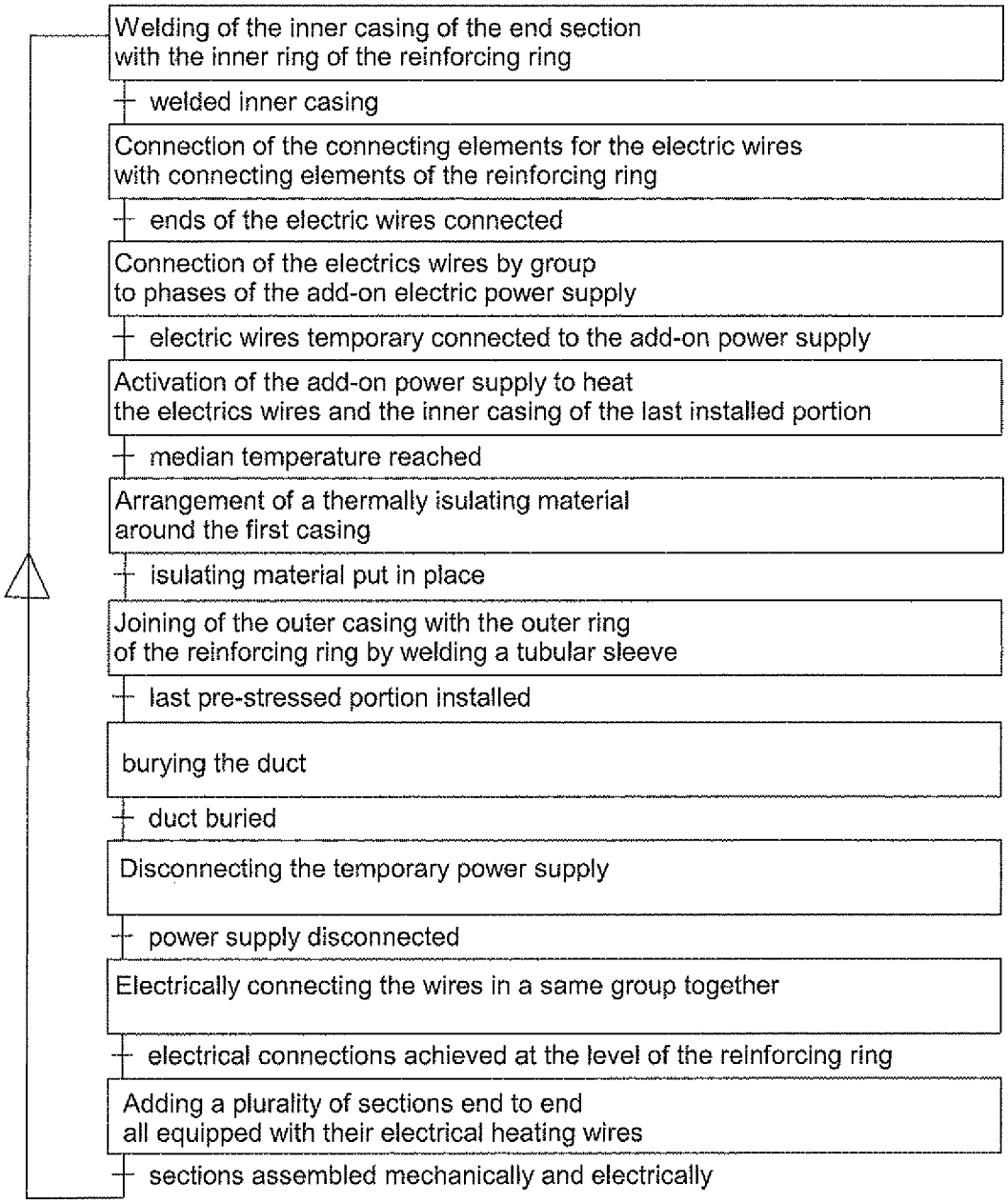
FIG. 13 shows the different stages in laying a pre-stressed pipe.
Figure 15:
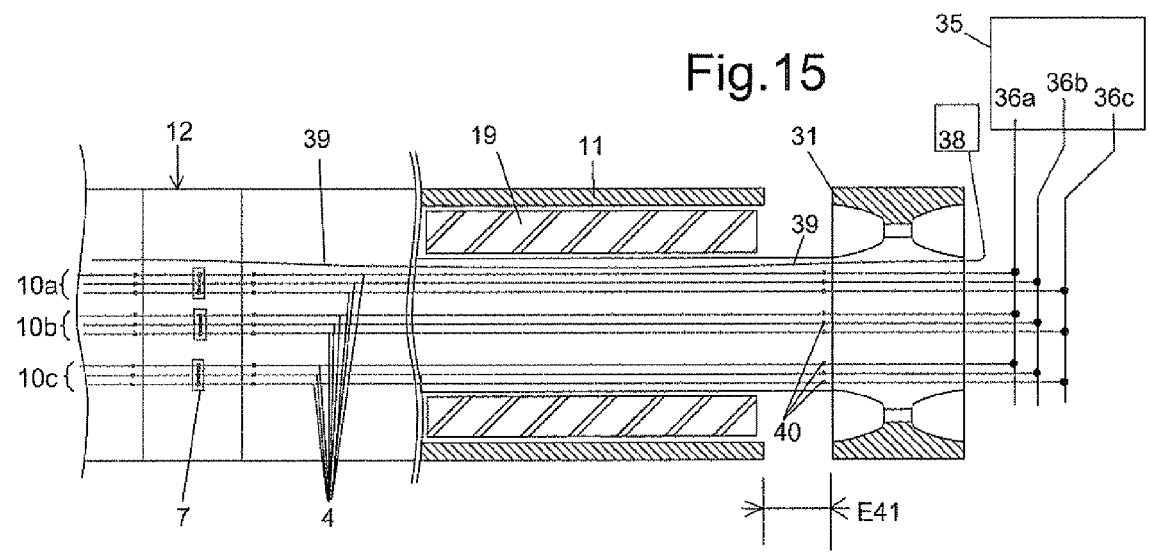
FIG. 15 shows a section view illustrating the temporary heating of the last portion of pipe installed.
Figure 16:
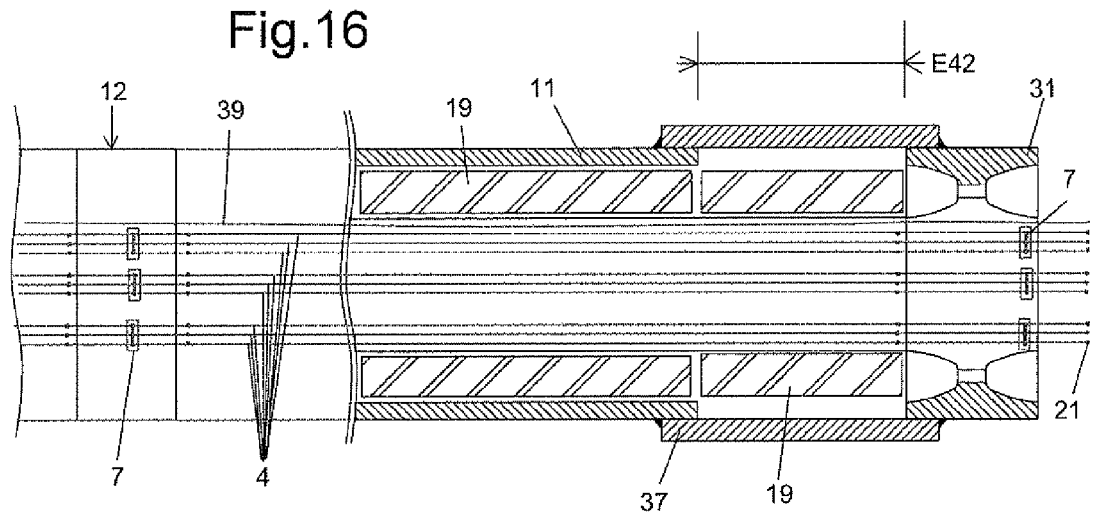
FIG. 16 shows a section view of the end of a pipe for which the last portion installed is pre-stressed.

One example of the installation of a pre-stressed pipe will now be described. Successive installation stapes are illustrated in FIG. 13 and diagrams of the end of the pipe during its installation process are shown in FIGS. 14 to 16 which illustrate said successive steps.

Figure 14:
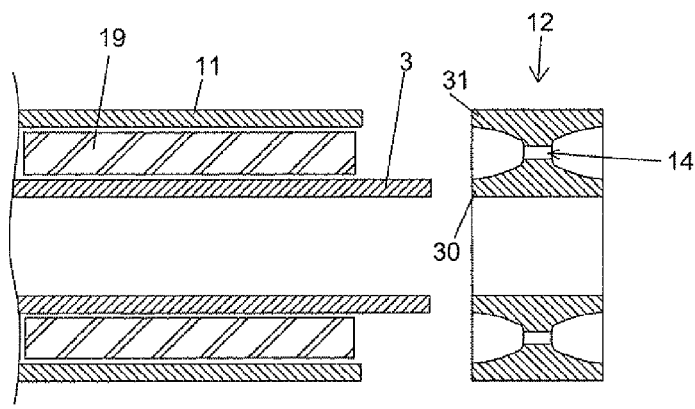
FIG. 14 shows a section view of a reinforcing ring arranged facing an end section.

As shown in FIG. 14, the end of the portion of pipe already installed has an inner casing 3 around which an outer casing 11 is arranged. These two casings 3 and 11 form a double-walled pipe. An annulus is formed between these two casings 3 and 11. A thermally insulating material 19 is namely arranged inside this annulus along with electrically insulated heating wires. An element to measure the temperature, such as an optical fiber to measure temperature, may also be provided in this annulus. The electric wires arranged against the inner casing 3 are dimensioned to enable the hydrocarbon transport pipe to be heated.

The inner casing 3 protrudes with respect to the outer casing 11 at the end of the pipe already installed. This inner casing 3 may thus be welded to the inner ring 30 of a reinforcing ring 12.

The reinforcing ring 12 (bulkhead) comprises an outer ring 31 integral with the inner ring 30. These rings 30 and 31 are linked together by a wall provided with passages 14 around its diameter. These passages 14 enable a link to be made with the electric wires arranged in the annulus.

After the inner casing has been welded to the inner ring 30 of the reinforcing ring 12, the connecting elements of the electric wires 4 are connected to the electrical connection elements in the reinforcing ring 12. These connection points 40 are namely shown in FIG. 15.

After the ends of the electric wires 4 have been connected, the electric wires are connected by group to the phases of an add-on power supply 35. This add-on power supply 35 comprises, for example, three phases 36*a*, 36*b* and 36*c* each connected to one of the three wires in a same group of wires. Since the electric wires 4 are connected together in each group at the level of the reinforcing ring 12 previously put in place, the last portion of each group of wires is thus powered in a star arrangement. Three groups 10*a*, 10*b* and 10*c* are shown each comprising three electric wires 4 joined together at the reinforcing ring 12 by electrical linking units 7.

Supplying electrical power to the resistive heating electric wires enables heat to be released by Joule effect. The pipe, and mainly its inner casing, is heated by conduction.

A single-phase add-on power supply may be used to heat the last portions of each group of electric wires. The electrical linking unit 7 for the wires in each group enables an electric current return.

Heating by the add-on power supply 35 is only temporary. The heating temperature may be monitored by an optical fiber 39 arranged in the annulus and placed against the inner casing 3. The optical fiber 39 is thus temporarily connected to a temperature monitoring device 38.

It is also possible for an axial dilation of the inner casing to be measured, such dilation being representative of the temperature of the inner casing.

After the electric wires 4 have been connected to the add-on power supply 35, the last portion of the installed pipe is heated. The return of the heating electric current is made via the electrical linking units 7 between the wires in the same group, these electrical linking units 7 being arranged in the reinforcing rings 12 previously installed.

Advantageously, the fact of being able to use electrical energy for the pre-stressing heating improves the efficiency of the pipe heating. The efficiency for heating using non reusable fluids is, for example, of 20% whereas the efficiency for electrical heating is, for example, of 90%.

Furthermore, fluid-based heating is more complicated to implement because of the necessity of temporarily installing a heating fluid circulation circuit.

Another advantage lies in the fact that only the last portion of pipe installed is heated to be able to perform pre-stressing. The installation of the pre-stressed pipe is thus facilitated. The targeted heating of the last portion installed further improves the efficiency.

The heating may be activated for a predetermined duration or depending on a measured temperature or observed dilation.

An operator can activate the add-on power supply 35 depending on the data read from the temperature monitoring device 38. When the required temperature is reached, the operator cuts off the add-on electric power supply 35.

An operator may also measure the axial dilation of the inner casing. When the inner casing is dilated by a predetermined length measured by the operator, the operator may cut off the add-on electrical power supply 35. For a portion of pipe 1 km in length installed in an environment at 0° C. and intended to operate at a temperature of 150° C., the operator heats this portion until it reaches an axial dilation of around 1 m. This axial dilation corresponds to a median temperature of 75° C.

Heating the inner casing 3 is thus activated to reach an intermediate temperature between a maximal operating temperature and a minimal external environment temperature. A median temperature is selected, for example. The heating mainly produces a dilation of the inner casing and the gap E41 between the outer casing and the reinforcing ring 12 increases with the increased temperature. A wider gap E42 corresponding to the desired intermediate temperature is shown in FIG. 16.

When the intermediate temperature has been reached, an insulating material 19 is placed around the inner casing 3. The insulating material is held in place, for example, by a thin steel sheet fastened around it.

After the insulating material 19 has been put in place, the outer casing 11 of the pipe is joined to the outer ring 31 of the reinforcing ring 12. This is performed by welding a tubular element.

The tubular element may be formed of a sleeve 37 whose inner diameter corresponds to the outer diameter of the pipe and to the outer diameter of the reinforcing ring 12.

The tubular element may also be formed by two semi-cylindrical half-shells whose outer diameter is the same as that of the pipe and reinforcing ring 12. Such half-shells have namely been described above with reference to FIG. 10.

Heating to the intermediate temperature allows the pipe to be pre-stressed. In a particularly cold external environment, the absolute value of the maximal stresses due to the variations in temperature is thus reduced. The pre-stress intermediate temperature adjusted to the median temperature between a minimal external temperature and a maximal operating temperature enables the maximal absolute values of the mechanical stresses to be reduced by about half.

After the tubular element has been fixed into position, the newly installed pipe portion is buried. The pre-stressed pipe is thus set into the ground. The inner casing may continue to be heated until the pipe is set into place.

After the last pre-stressed pipe portion has been set, the add-on electrical power supply 35 is disconnected. The temperature monitoring device 38 is also disconnected.

After the add-on electrical power supply 35 has been disconnected, the electric heating wires from each group 10a, 10b and 10c are connected together by means of the electrical linking unit 7, as shown in FIG. 16.

The end of the pipe is thus ready to be joined to other sections equipped with their heating wires.

According to a variant that has not been illustrated, it is also possible for the burying step to be performed after the electrical power supply has been disconnected and after the electric heating wires have been connected together in each of the groups.

The inner casing of the following section is welded to the inner ring 30 of the reinforcing ring 12. The electrical connections 21 of the reinforcing ring are connected to those of the section. The outer casing of the section is welded to the outer ring of the reinforcing ring.

Several sections are then assembled end to end electrically and mechanically. The inner casings are welded together. The electrical connections are made two by two. The outer casings are welded together.

Thereafter, the step in which the inner casing of the end section is welded to the inner ring of a reinforcing ring 12 can be repeated, as described previously.

It must be obvious for one skilled in the art that the present invention enables other variant embodiments. Consequently, the present embodiments must be considered as merely illustrative of the invention defined by the enclosed claims.

What is claimed is:

1. A section of a fluid transport metal pipe comprising;
a first casing in which the fluid to be transported flows, and
a second casing arranged around and at a distance from said first casing and forming an annulus,
wherein said section is equipped with a heating system comprising electric wires arranged around said first casing and intended to be powered, via connection elements, to connect two by two said electric wires of two sections joined together, said electric wires being powered by an electrical power supply comprising several phases, said electric wires being arranged in at least one set of several groups each comprising several of said electric wires, each of said groups in said set being intended to be supplied by a distinct phase, said electrical heating system comprising connecting units to perform an electrical connection and linking together said electric wires of each of said groups,
wherein said electric heating wires, arranged on the first casing, are electrically insulated by an electrically insulating, thermally conducting sheath, and
wherein said annulus houses said connection units and said set or said sets of said groups of said electric wires.

2. A section according to claim 1, wherein said connecting units are arranged in an intermediate zone between the two ends of said section.

3. A section according to claim 1, wherein said connection elements, arranged at the two ends of said section, are associated with identification elements for said wires belonging to the same group.

4. A section according claim 1, wherein said set comprises as many groups as the number of phases in said power supply, each of said group of said set comprising the same number of electric wires, said groups in said set all having the same impedance.

5. A section according to claim 4, further comprising a plurality of said sets of several groups of several electric wires.

6. A section according to, claim 1, further comprising a reinforcing ring linking said first and second casings and forming an annular wall between said first and second casings, said annular wall in which passages are arranged to accommodate said connection units.

7. A section according to claim 6, arranged in a straight section.

8. A section according to claim 1, further comprising an external mark to indicate the presence of said connecting units.

9. A fluid transport metal pipe comprising sections each equipped with electric heating wires linked together by connection elements at the junction between the sections, the connection elements arranged at one end of the said pipe being linked to saga power supply or to a neutral point of a final electric connector, wherein one or several sections are of a first type of section comprising a first casing in which the fluid to be transported flows and a heating system comprising said electric wires arranged around said first casing and intended to be powered via said connection elements connecting two by two said electric wires of two sections joined together, said electric wires being powered by said electrical power supply comprising several phases, said electric wires being arranged in at least one set of several groups each comprising several of said electric wires, each of said groups in said set being intended to be supplied by a distinct phase, said electrical heating system comprising connecting units to perform an electrical connection and linking together said electric wires of each of said groups.

10. A fluid transport pipe according to claim 9, further comprising further sections of a second type that are not equipped with said connecting units, the two types of sections being equipped with the same number of said electric heating wires connected in series at the junction between two sections.

11. A fluid transport pipe according to claim 9, wherein said power supply, of the three-phase type, comprises three phases at one end of the pipe to the electric wires, all of said the electric wires of all said groups of all said sets being further linked together at the other end of said fluid transport pipe to form a star assembly.

12. A laying process for said hydrocarbon transport pipe comprising sections, said each section comprising an inner casing in which the fluid to be transported flows and an outer casing between which an annular space is formed in which an insulating material and electric wires are arranged around said inner casing that are intended to be supplied with electrical power via connection elements, by a main power supply comprising several phases, process wherein:

said inner casing of an end section is welded to an inner ring of a reinforcing ring comprising an external ring integral with its inner ring, said connection elements of said electric wires are connected to said connection elements of the reinforcing ring according to at least one set of several groups of several electric wires, each of said groups in said set being intended to be powered by a distinct phase of said main power supply, said electric heating wires are temporarily powered by at least one add-on power supply comprising several phases each distinctly powering one of said electric wires in the same group, said outer casing of said pipe is joined to said external ring of said reinforcing ring by welding a tubular element formed by a sleeve or by two half-shells, said electric wires of each of the said groups are electrically connected together.

13. A process according to claim 12, wherein when said electric heating wires are temporarily powered by said add-on power supply, the temperature of said inner casing is monitored, directly or by measurement of the corresponding axial dilation of said inner casing, to pilot the heating of said inner casing up to a median temperature that is between a maximal operating temperature and a minimal temperature of the external environment.

14. A process according to claim 13, wherein the stage during which said outer casing of said pipe is joined to the external ring of said reinforcing ring is preceded by a stage in which a thermally insulating material is arranged around said first casing radially in relation to the installation zone of said tubular element.

15. A process according to claim 14, wherein a plurality of sections is mechanically and electrically joined together, said sections being arranged between two reinforcing rings wherein said electrical connection of said electric wires in a same group is performed.

16. A fluid transport pipe according to claim 9, wherein in each section of the first type, said connecting units are arranged in an intermediate zone between the two ends of said section.

17. A fluid transport pipe according to claim 9, wherein in each section of the first type, said connection elements, arranged at the two ends of said first section, are associated with identification elements for said wires belonging to the same group.

18. A fluid transport pipe according to claim 9, wherein in each section of the first type, said set comprises as many groups as the number of phases in said power supply, each of said group of said set comprising the same number of electric wires, said groups in said set all having the same impedance.

19. A fluid transport pipe according to claim 18, wherein each section of the first type further comprises a plurality of said sets of several groups of several electric wires.

20. A fluid transport pipe according to claim 9, wherein in each section of the first type, said electric heating wires, arranged on the metal fluid transport pipe, are electrically insulated by an electrically insulating, thermally conducting sheath.

21. A fluid transport pipe according to claim 20, wherein each section of the first type further comprises a second casing arranged around and at a distance from said first casing, forming an annulus to house said connection units and said set or said sets of said groups of said electric wires.

22. A fluid transport pipe according to claim 21, wherein at least one section of the first type further comprises a reinforcing ring linking said first and second casings and forming an annular wall between said first and second casings, said annular wall in which passages are arranged to accommodate said connection units.

23. A fluid transport pipe according to claim 22, wherein each section of the first type is arranged in a straight section.

24. A fluid transport pipe according to claim 9, wherein each section of the first type further comprises an external mark to indicate the presence of said connecting units.

* * * * *